United States Patent
Chen et al.

(10) Patent No.: US 7,031,742 B2
(45) Date of Patent: Apr. 18, 2006

(54) FORWARD AND REVERSE LINK POWER CONTROL OF SERVING AND NON-SERVING BASE STATIONS IN A WIRELESS COMMUNICATION SYSTEM

(75) Inventors: Tao Chen, San Diego, CA (US); Yongbin Wei, San Diego, CA (US); Avinash Jain, San Diego, CA (US); Edward G. Tiedemann, Jr., Concord, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/360,169

(22) Filed: Feb. 5, 2003

(65) Prior Publication Data

US 2004/0203991 A1  Oct. 14, 2004

Related U.S. Application Data

(60) Provisional application No. 60/355,223, filed on Feb. 7, 2002, provisional application No. 60/356,929, filed on Feb. 12, 2002, provisional application No. 60/360,271, filed on Feb. 26, 2002, provisional application No. 60/362,119, filed on Mar. 5, 2002.

(51) Int. Cl.
*H04Q 7/20* (2006.01)
(52) U.S. Cl. .............. 455/522; 455/69; 455/127.1; 375/130
(58) Field of Classification Search .......... 455/522, 455/69, 500, 67.11, 67.13, 226.1, 226.2, 226.3, 455/226.4, 131, 132, 133, 134, 135, 426, 455/442, 127.1; 370/331, 333, 335, 342; 375/130
See application file for complete search history.

(56) References Cited

U.S. PATENT DOCUMENTS

| | | | | |
|---|---|---|---|---|
| 5,590,409 A | * | 12/1996 | Sawahashi et al. | 455/69 |
| 5,839,056 A | * | 11/1998 | Hakkinen | 455/69 |
| 5,940,430 A | | 8/1999 | Love et al. | |
| 6,226,316 B1 | * | 5/2001 | Schilling et al. | 375/142 |
| 6,229,795 B1 | | 5/2001 | Pankaj et al. | |
| 6,335,922 B1 | | 1/2002 | Tiedemann, Jr. et al. | |

(Continued)

FOREIGN PATENT DOCUMENTS

WO  WO 99/29048  *  6/1999

(Continued)

OTHER PUBLICATIONS

Parks, S. et al.,"Uplink Transmit Power Control During Soft Handoff in DS/CDMA Systems,"VTC 2001 Spring, IEEE vol. 4 of 4, Conf. 53, May 2001, pp. 2913-2917.

Primary Examiner—Tilahun Gesesse
(74) Attorney, Agent, or Firm—Philip R. Wadsworth; Thien T. Nguyen; Roberta A. Young

(57) ABSTRACT

Techniques for power control of serving and non-serving base stations are disclosed. In one aspect, power control commands for a plurality of base stations are combined to form a single command to control the plurality of base control. In another aspect, an "Or-of-up" rule is used to combine the power control commands. In yet another aspect, a channel quality indicator is used to power control a serving base station. Various other aspects are also presented. These aspects have the benefit of providing efficient power control between a mobile station and both serving and non-serving base stations, thus avoiding excessive interference and increasing capacity.

15 Claims, 10 Drawing Sheets

U.S. PATENT DOCUMENTS

| | | | |
|---|---|---|---|
| 6,411,799 B1* | 6/2002 | Padovani | 455/69 |
| 6,434,367 B1* | 8/2002 | Kumar et al. | 455/70 |
| 6,442,155 B1 | 8/2002 | Suk et al. | |
| 6,597,679 B1* | 7/2003 | Willars | 370/342 |
| 6,603,752 B1* | 8/2003 | Saifuddin et al. | 370/335 |
| 6,625,198 B1* | 9/2003 | Tiedemann et al. | 375/130 |
| 6,650,905 B1* | 11/2003 | Toskala et al. | 455/522 |
| 2002/0010001 A1* | 1/2002 | Dahlman et al. | 455/522 |
| 2002/0082038 A1* | 6/2002 | Mochizuki | 455/522 |
| 2002/0094834 A1* | 7/2002 | Baker et al. | 455/522 |
| 2002/0123351 A1* | 9/2002 | Miyoshi et al. | 455/452 |
| 2003/0050084 A1* | 3/2003 | Damnjanovic et al. | 455/522 |

FOREIGN PATENT DOCUMENTS

| | | | |
|---|---|---|---|
| WO | WO 00/49728 | * | 8/2000 |
| WO | WO 0049728 A | | 8/2000 |
| WO | WO 0101599 A | | 1/2001 |

* cited by examiner

FORWARD AND REVERSE LINK POWER CONTROL OF SERVING AND NON-SERVING BASE STATIONS IN A WIRELESS COMMUNICATION SYSTEM

CLAIM OF PRIORITY UNDER 35 U.S.C. §119

The present Application for Patent claims priority to Provisional Application No. 60/355,223 entitled "METHOD AND APPARATUS FOR FORWARD LINK POWER CONTROL DURING SOFT HANDOFF IN A COMMUNICATION SYSTEM" filed Feb. 7, 2002; and to Provisional Application No. 60/356,929 entitled "METHOD AND APPARATUS FOR FORWARD LINK POWER CONTROL DURING SOFT HANDOFF IN A COMMUNICATION SYSTEM" filed Feb. 12, 2002; and to Provisional Application No. 60/360,271 entitled "POWER CONTROL OF THE F-CPCCPH (FORWARD COMMON POWER CONTROL CHANNEL) IN IS-2000 REV.C (1XEV-DV)" filed Feb. 26, 2002; and to Provisional Application No. 60/362,119 entitled "POWER CONTROL USING PC BIT STREAMS OF DIFFERENT RATES" filed Mar. 5, 2002; all assigned to the assignee hereof and hereby expressly incorporated by reference herein.

BACKGROUND

1. Field

The present invention relates generally to communications, and more specifically to a novel and improved method and apparatus for power control of serving and non-serving base stations.

2. Background

Wireless communication systems are widely deployed to provide various types of communication such as voice and data. These systems may be based on code division multiple access (CDMA), time division multiple access (TDMA), or some other multiple access techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project -2" (3GPP2) and embodied in "TR-45.5 Physical Layer Standard for cdma2000 Spread Spectrum Systems" (the IS-2000 standard), and (4) some other standards.

In the above named standards, the available spectrum is shared simultaneously among a number of users, and techniques such as power control and soft handoff are employed to maintain sufficient quality to support delay-sensitive services, such as voice. Data services are also available. More recently, systems have been proposed that enhance the capacity for data services by using higher order modulation, very fast feedback of Carrier-to-Interference ratio (C/I) from the mobile station, very fast scheduling, and scheduling for services that have more relaxed delay requirements. An example of such a data-only communication system using these techniques is the High Data Rate (HDR) system that conforms to the TIA/EIA/IS-856 standard (the IS-856 standard).

In contrast to the other above named standards, an IS-856 system uses the entire spectrum available in each cell to transmit data to a single user at one time, wherein the user is selected based on link quality and other considerations, such as data pending, etc. In so doing, the system spends a greater percentage of time sending data at higher rates when the channel is good, and thereby avoids committing resources to support transmission at inefficient rates. The net effect is higher data capacity, higher peak data rates, and higher average throughput.

Systems may may incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1xEV-DV", submitted to 3GPP2 as document number C50-20010820-012, Aug. 20, 2001. These, and related documents generated subsequently, such as Revision C of the IS-2000 standard, including C.S0001.C through C.S0006.C, are hereinafter referred to as the 1xEV-DV proposal.

A system such as the one described in the 1xEV-DV proposal generally comprises channels of four classes: overhead channels, dynamically varying IS-95 and IS-2000 channels, a Forward Packet Data Channel (F-PDCH), and some spare channels. The overhead channel assignments vary slowly, they may not change for months. They are typically changed when there are major network configuration changes. The dynamically varying IS-95 and IS-2000 channels are allocated on a per call basis or are used for IS-95, or IS-2000 Release 0 through B packet services. Typically, the available base station power remaining after the overhead channels and dynamically varying channels have been assigned is allocated to the F-PDCH for remaining data services. The F-PDCH may be used for data services that are less sensitive to delay while the IS-2000 channels are used for more delay-sensitive services.

The F-PDCH, similar to the traffic channel in the IS-856 standard, is used to send data at the highest supportable data rate to one user in each cell at a time. In IS-856, the entire power of the base station and the entire space of Walsh functions are available when transmitting data to a mobile station. However, in the proposed 1xEV-DV system, some base station power and some of the Walsh functions are allocated to overhead channels and existing IS-95 and cdma2000 services. The data rate that is supportable depends primarily upon the available power and Walsh codes after the power and Walsh codes for the overhead, IS-95, and IS-2000 channels have been assigned. The data transmitted on the F-PDCH is spread using one or more Walsh codes.

In the 1xEV-DV proposal, the base station generally transmits to one mobile station on the F-PDCH at a time, although many users may be using packet services in a cell. (It is also possible to transmit to two or more users, by scheduling transmissions for the two or more users and allocating power and/or Walsh channels to each user appropriately.) Mobile stations are selected for forward link transmission based upon some scheduling algorithm.

In a system similar to IS-856 or 1xEV-DV, scheduling is based in part on channel quality feedback from the mobile stations being serviced. For example, in IS-856, mobile stations estimate the quality of the forward link and compute a transmission rate expected to be sustainable for the current conditions. The desired rate from each mobile station is transmitted to the base station. The scheduling algorithm may, for example, select a mobile station for transmission that supports a relatively higher transmission rate in order to make more efficient use of the shared communication channel. As another example, in a 1xEV-DV system, each mobile station transmits a Carrier-to-Interference (C/I) estimate as the channel quality estimate on the Reverse Channel Quality Indicator Channel or R-CQICH. The scheduling algorithm is used to determine the mobile station selected for transmission, as well as the appropriate rate and transmission format in accordance with the channel quality. A variety of scheduling algorithms may be implemented, such as the Proportional-Fair algorithm detailed in U.S. Pat. No. 6,229,795.

In such a system, a mobile station receives forward link data from a serving base station. As described, reverse link feedback from a mobile station to the serving station may be used for forward link scheduling and transmission, and may also be used for serving base station power control. Soft handoff in the above listed systems is not used for such forward link data transmission. That is, a mobile station will not receive the Forward Packet Data Channel, or F-PDCH, from more than one base station. However, a mobile station may be in soft handoff on the reverse link with one or more non-serving base stations and/or sectors to provide reverse link switching diversity. Since the path loss characteristics of each path between a mobile station and multiple base stations will, in general, be different, the serving base station power control mechanism for its transmission to the mobile station may not be suitable for non-serving base stations for the same mobile station. To optimize system capacity, it is desirable for the reverse link as well as any forward link signaling between a mobile station and non-serving base stations to be power controlled. However, maintaining a power control loop for each non-serving base station may use excessive resources on the reverse link. There is therefore a need in the art for power control of serving and non-serving base stations.

SUMMARY

Embodiments disclosed herein address the need for power control of serving and non-serving base stations. In one aspect, power control commands for a plurality of base stations are combined to form a single command to control the plurality of base stations. In another aspect, an "Or-of-up" rule is used to combine the power control commands. In yet another aspect, a channel quality indicator is used to power control a serving base station. Various other aspects are also presented. These aspects have the benefit of providing efficient power control between a mobile station and both serving and non-serving base stations, thus avoiding excessive interference and increasing capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
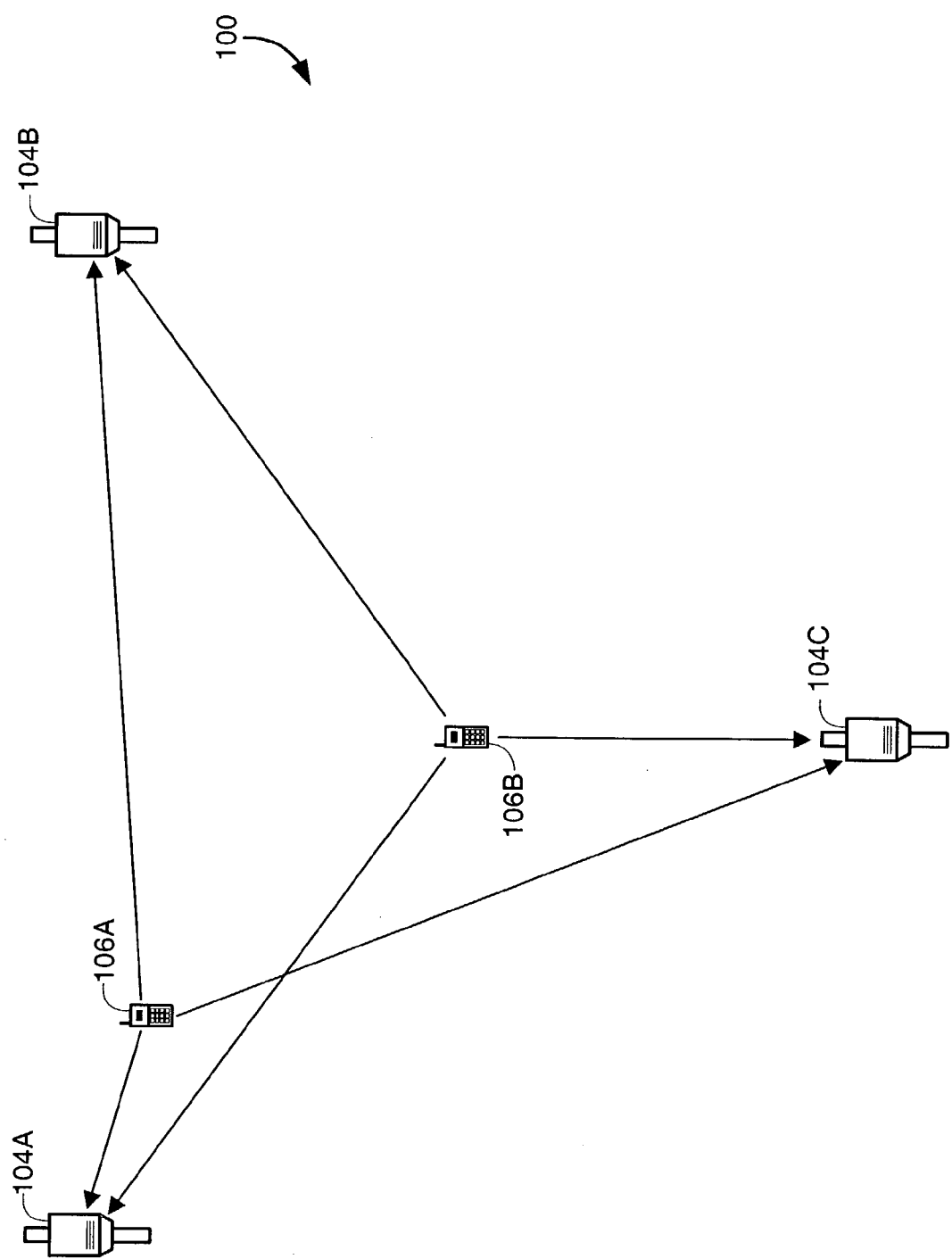
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification, the 1xEV-DV proposal). In an alternative embodiment, system 100 may also deploy any wireless standard or design other than a CDMA system.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station may be used interchangeably with the terms access point or Node B. The term mobile station may be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations may be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

As described above, a wireless communication system 100 may support multiple users sharing the communication resource simultaneously, such as an IS-95 system, may allocate the entire communication resource to one user at a time, such as an IS-856 system, or may apportion the communication resource to allow both types of access. A 1xEV-DV system is an example of a system that divides the communication resource between both types of access, and dynamically allocates the apportionment according to user demand. Following is a brief background on how the communication resource may be allocated to accommodate various users in both types of access systems. Power control is described for simultaneous access by multiple users, such as IS-95 type channels. Rate determination and scheduling is discussed for time-shared access by multiple users, such as an IS-856 system or the data-only portion of a 1xEV-DV type system (i.e., the F-PDCH). Note that "outer loop" is a term used in the art relating to both access types, but it's meaning may be different in the two contexts.

Capacity in a system such as an IS-95 CDMA system is determined in part by interference generated in transmitting signals to and from various users within the system. A feature of a typical CDMA system is to encode and modulate signals for transmission to or from a mobile station such that the signals are seen as interference by other mobile stations. For example, on the forward link, the quality of the channel between a base station and one mobile station is determined in part by other user interference. To maintain a desired performance level of communication with the mobile station, the transmit power dedicated to that mobile station must be sufficient to overcome the power transmitted to the other mobile stations served by the base station, as well as other disturbances and degradation experienced in that channel. Thus, to increase capacity, it is desirable to transmit the minimum power required to each mobile station served.

In a typical CDMA system, when multiple mobile stations are transmitting to a base station, it is desirable to receive a plurality of mobile station signals at the base station at a normalized power level. Thus, for example, a reverse link power control system may regulate the transmit power from each mobile station such that signals from nearby mobile stations do not overpower signals from farther away mobile stations. As with the forward link, keeping the transmit power of each mobile station at the minimum power level required to maintain the desired performance level allows for capacity to be optimized, in addition to other benefits of power savings such as increased talk and standby times, reduced battery requirements, and the like.

Capacity in a typical CDMA system, such as IS-95, is constrained by, among other things, other-user interference. Other-user interference may be mitigated through use of power control. The overall performance of the system, including capacity, voice quality, data transmission rates and throughput, is dependant upon stations transmitting at the lowest power level to sustain the desired level of performance whenever possible. To accomplish this, various power control techniques are known in the art.

One class of techniques includes closed loop power control. For example, closed loop power control may be deployed on the forward link. Such systems may employ an inner and outer power control loop in the mobile station. An outer loop determines a target received power level according to a desired received error rate. For example, a target frame error rate of 1% may be pre-determined as the desired error rate. The outer loop may update the target received power level at a relatively slow rate, such as once per frame or block. In response, the inner loop then sends up or down power control messages to the base station until received power meets the target. These inner loop power control commands occur relatively frequently, so as to quickly adapt the transmitted power to the level necessary to achieve the desired received signal to noise and interference ratio for efficient communication. As described above, keeping the forward link transmit power for each mobile station at the lowest level reduces other user interference seen at each mobile station and allows remaining available transmit power to be reserved for other purposes. In a system such as IS-95, the remaining available transmit power may be used to support communication with additional users. In a system such as 1xEV-DV, the remaining available transmit power may be used to support additional users, or to increase the throughput of the data-only portion of the system. The outer loop or inner loop for power control just described may be different from similarly labeled control loops defined for use with data-only channels, described below.

In a "data-only" system, such as IS-856, or in the "data-only" portion of a system, such as 1xEV-DV, a control loop may be deployed to govern the transmission from the base station to a mobile station in a time-shared manner. For clarity, in the following discussion, transmission to one mobile station at a time is described. This is to distinguish from a simultaneous access system, an example of which is IS-95, or various channels in a cdma200 or 1xEV-DV system. Two notes are in order at this point.

First, the term "data-only" or "data channel" may be used to distinguish a channel from IS-95 type voice or data channels (i.e. simultaneous access channels using power control, as described above) for clarity of discussion only. It will be apparent to those of skill in the art that data-only or data channels described herein may be used to transmit data of any type, including voice (e.g., voice over Internet Protocol, or VOIP). The usefulness of any particular embodiment for a particular type of data may be determined in part by the throughput requirements, latency requirements, and the like. Those of skill in the art will readily adapt various embodiments, combining either access type with parameters selected to provide the desired levels of latency, throughput, quality of service, and the like.

Second, a data-only portion of a system, such as that described for 1xEV-DV, which is described as time-sharing the communication resource, may be adapted to provide access to more than one user simultaneously. In examples herein where the communication resource is described as time-shared to provide communication with one mobile station or user during a certain period, those of skill in the art will readily adapt those examples to allow for time-shared transmission to or from more than one mobile station or user within that time period.

A typical data communication system may include one or more channels of various types. More specifically, one or more data channels are commonly deployed. It is also common for one or more control channels to be deployed, although in-band control signaling may be included on a data channel. For example, in a 1xEV-DV system, a Forward Packet Data Control Channel (F-PDCCH) and a Forward Packet Data Channel (F-PDCH) are defined for transmission of control and data, respectively, on the forward link.

Figure 2:
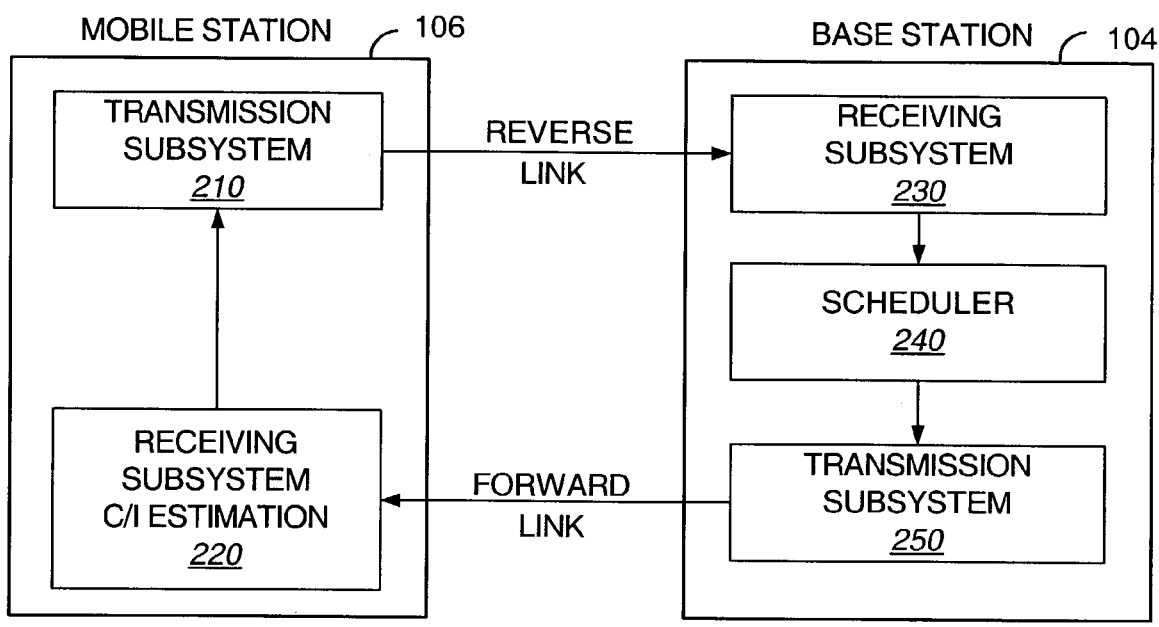
FIG. 2 depicts an example mobile station and base station configured in a system adapted for data communication.

FIG. 2 depicts an example mobile station 106 and base station 104 configured in a system 100 adapted for data communication. Base station 104 and mobile station 106 are shown communicating on a forward and a reverse link. Mobile station 106 receives forward link signals in receiving subsystem 220. A base station 104 communicating the forward data and control channels, detailed below, may be referred to herein as the serving station for the mobile station 106. An example receiving subsystem is detailed further below with respect to FIG. 3. A Carrier-to-Interference (C/I) estimate is made for the forward link signal received from the serving base station in the mobile station 106. A C/I measurement is an example of a channel quality metric used as a channel estimate, and alternate channel quality metrics may be deployed in alternate embodiments. The C/I measurement is delivered to transmission subsystem 210 in the base station 104, an example of which is detailed further below with respect to FIG. 3.

The transmission subsystem 210 delivers the C/I estimate over the reverse link where it is delivered to the serving base station. Note that, in a soft handoff situation, well known in the art, the reverse link signals transmitted from a mobile station may be received by one or more base stations other than the serving base station, referred to herein as non-serving base stations. Receiving subsystem 230, in base station 104, receives the C/I information from mobile station 106.

Scheduler 240, in base station 104, is used to determine whether and how data should be transmitted to one or more mobile stations within the serving cell's coverage area. Any type of scheduling algorithm may be deployed within the scope of the present invention. One example is disclosed in U.S. Pat. No. 6,335,922, issued on Jan. 1, 2002 entitled "METHOD AND APPARATUS FOR FORWARD LINK RATE SCHEDULING", assigned to the assignee of the present invention.

In an example 1xEV-DV embodiment, a mobile station is selected for forward link transmission when the C/I measurement received from that mobile station indicates that data may be transmitted at a certain rate. It is advantageous, in terms of system capacity, to select a target mobile station such that the shared communication resource is always utilized at its maximum supportable rate. Thus, the typical target mobile station selected may be the one with the greatest reported C/I. Other factors may also be incorporated in a scheduling decision. For example, minimum quality of service guarantees may have been made to various users. It may be that a mobile station, with a relatively lower reported C/I, is selected for transmission to maintain a minimum data transfer rate to that user.

In the example 1xEV-DV system, scheduler 240 determines which mobile station to transmit to, and also the data rate, modulation format, and power level for that transmission. In an alternate embodiment, such as an IS-856 system, for example, a supportable rate/modulation format decision may be made at the mobile station, based on channel quality measured at the mobile station, and the transmit format may be transmitted to the serving base station in lieu of the C/I measurement. Those of skill in the art will recognize myriad combinations of supportable rates, modulation formats, power levels, and the like which may be deployed within the scope of the present invention. Furthermore, although in various embodiments described herein the scheduling tasks are performed in the base station, in alternate embodiments, some or all of the scheduling process may take place in the mobile station.

Scheduler 240 directs transmission subsystem 250 to transmit to the selected mobile station on the forward link using the selected rate, modulation format, power level, and the like.

In the example embodiment, messages on the control channel, or F-PDCCH, are transmitted along with data on the data channel, or F-PDCH. The control channel may be used to identify the recipient mobile station of the data on the F-PDCH, as well as identifying other communication parameters useful during the communication session. A mobile station should receive and demodulate data from the F-PDCH when the F-PDCCH indicates that mobile station is the target of the transmission. The mobile station responds on the reverse link following the receipt of such data with a message indicating the success or failure of the transmission. Retransmission techniques, well known in the art, are commonly deployed in data communication systems.

A mobile station may be in communication with more than one base station, a condition known as soft handoff. Soft handoff may include multiple sectors from one base station (or one Base Transceiver Subsystem (BTS)), known as softer handoff, as well as with sectors from multiple BTSs. Base station sectors in soft handoff are generally stored in a mobile station's Active Set. In a simultaneously shared communication resource system, such as IS-95, IS-2000, or the corresponding portion of a 1xEV-DV system, the mobile station may combine forward link signals transmitted from all the sectors in the Active Set. In a data-only system, such as IS-856, or the corresponding portion of a 1xEV-DV system, a mobile station receives a forward link data signal from one base station in the Active Set, the serving base station (determined according to a mobile station selection algorithm, such as those described in the C.S0002.C standard). Other forward link signals, examples of which are detailed further below, may also be received from non-serving base stations.

Reverse link signals from the mobile station may be received at multiple base stations, and the quality of the reverse link is generally maintained for the base stations in the active set. It is possible for reverse link signals received at multiple base stations to be combined. In general, soft combining reverse link signals from non-collocated base stations would require significant network communication bandwidth with very little delay, and so the example systems listed above do not support it. In softer handoff, reverse link signals received at multiple sectors in a single BTS may be combined without network signaling. While any type of reverse link signal combining may be deployed within the scope of the present invention, in the example systems described above, reverse link power control maintains quality such that reverse link frames are successfully decoded at one BTS (switching diversity).

In a simultaneously shared communication resource system, such as IS-95, IS-2000, or the corresponding portion of a 1xEV-DV system, each base station in soft handoff with a mobile station (i.e., in the mobile station's Active Set) measures the reverse link pilot quality of that mobile station and sends out a stream of power control commands. In IS-95 or IS-2000 Rev. B, each stream is punctured onto the Forward Fundamental Channel (F-FCH) or the Forward Dedicated Control Channel (F-DCCH), if either is assigned. The stream of commands for a mobile station is called the Forward Power Control Subchannel (F-PCSCH) for that mobile station. The mobile station receives the parallel command streams from all its Active Set members for each base station (multiple sectors from one BTS, if all in the Active Set of the mobile station, send the same command to that mobile station) and determines if an "up" or "down" command was sent. The mobile station modifies the reverse link transmit power level accordingly, using the "Or-of-downs" rule, that is, the transmit power level is reduced if any "down" command is received, and increased otherwise.

The transmit power level of the F-PCSCH is typically tied to the level of the host F-FCH or F-DCCH that carries the subchannel. The host F-FCH or F-DCCH transmit power level at the base station is determined by the feedback from the mobile station on the Reverse Power Control Subchannel (R-PCSCH), which occupies the last quarter of the Reverse Pilot Channel (R-PICH). Since the F-FCH or the F-DCCH from each base station forms a single stream of traffic channel frames, the R-PCSCH reports the combined decoding results of these legs. Erasures of the F-FCH or the F-DCCH determine the required Eb/Nt set point of the outer loop, which in turn drives the inner loop commands on the R-PCSCH and thus the base station transmit levels of the F-FCH, F-DCCH, as well as the F-PCSCH on them.

Due to the potential differences in reverse link path loss to each base station from a single mobile station in soft handoff, some of the base stations in the Active Set may not receive the R-PCSCH reliably and may not correctly control the forward link power of the F-FCH, F-DCCH, and the F-PCSCH. The base stations may need to re-align the transmit levels among themselves so that the mobile station retains the spatial diversity gain of soft handoff. Otherwise, some of the forward link legs may carry little or no traffic signal energy due to errors in the feedback from the mobile station.

Since different base stations may need different mobile station transmit power for the same reverse link set point or reception quality, the power control commands from different base stations may be different and cannot be soft combined at the MS. When new members are added to the Active Set (i.e. no soft handoff to 1-way soft handoff, or from 1-way to 2-way, etc.), the F-PCSCH transmit power is increased relative to its host F-FCH or F-DCCH. This may be because the latter has both more spatial diversity (less total Eb/Nt required) and load sharing (less energy per leg) while the former has none.

By contrast, in a 1xEV-DV system, the Forward Common Power Control Channel (F-CPCCH) transports the reverse link power control commands for mobile stations without the Forward Fundamental Channel (F-FCH) or the Forward Dedicated Control Channel (F-DCCH). In earlier versions of the 1xEV-DV proposal, it has been assumed that the base station transmit power level of the F-CPCCH is determined by the Reverse Channel Quality Indicator Channel (R-CQICH) received from the mobile station. The R-CQICH may be used in scheduling, to determine the appropriate forward link transmission format and rate in response to forward link channel quality measurements.

However, when the mobile station is in soft handoff, the R-CQICH only reports the forward link pilot quality of the serving base station sector and therefore cannot be used to directly power control the F-CPCCH from the non-serving base stations. Various approaches to solve this problem are discussed below. An example approach is as follows: Reverse link power control is maintained for all Active Set members. The mobile stations use an "Or-of-down" rule, as described above, to change the reverse link transmit level. The R-CQICH is used to power control the serving base station. Another rule, such as the "Or-of-up" rule, described further below, is used at the mobile station to generate a single power control feedback stream for all the non-serving base stations.

Figure 3:
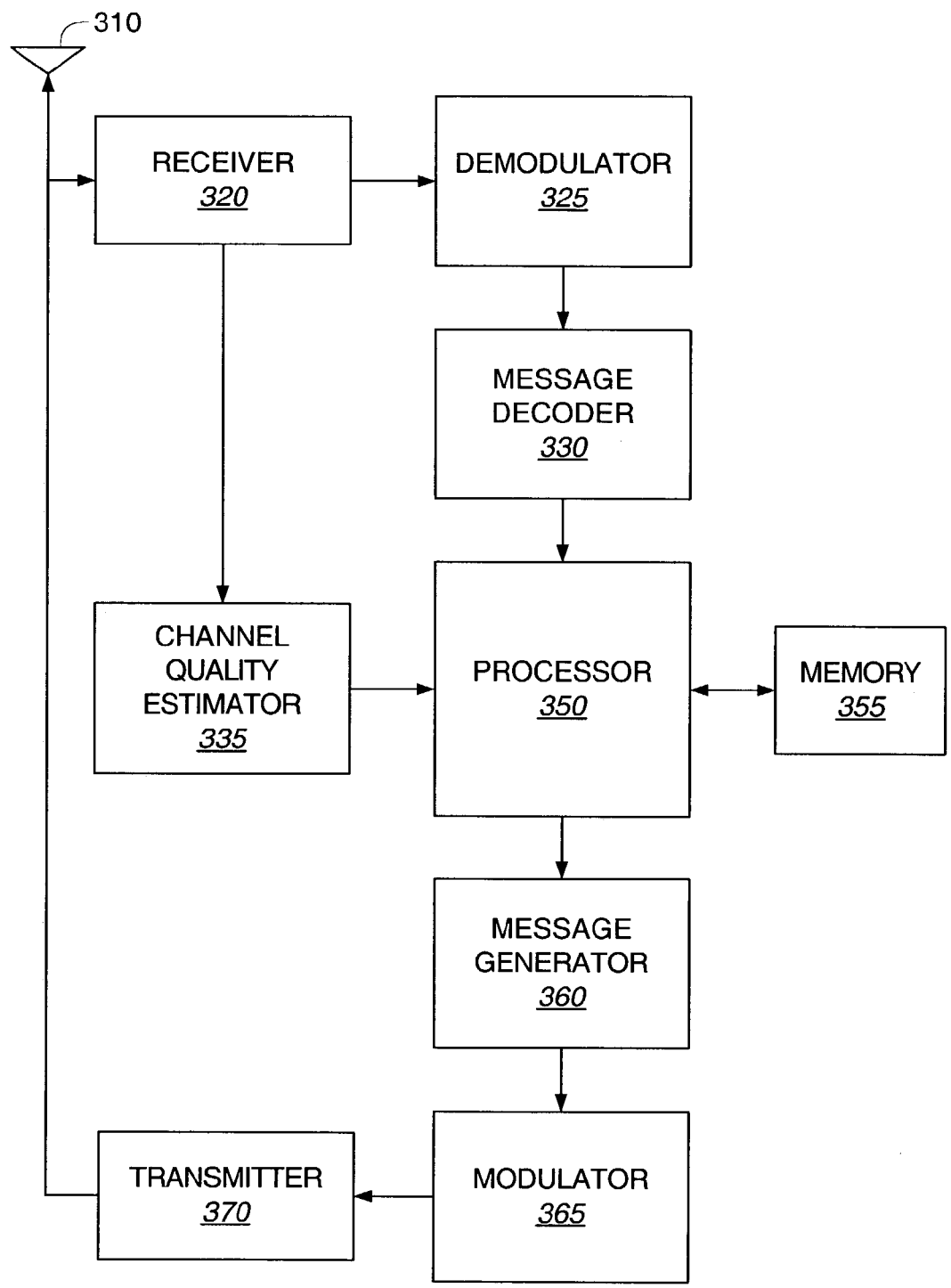
FIG. 3 is a block diagram of a wireless communication device, such as a mobile station or base station.

FIG. 3 is a block diagram of a wireless communication device, such as mobile station 106 or base station 104. The blocks depicted in this example embodiment will generally be a subset of the components included in either a base station 104 or mobile station 106. Those of skill in the art will readily adapt the embodiment shown in FIG. 3 for use in any number of base station or mobile station configurations.

Signals are received at antenna 310 and delivered to receiver 320. Receiver 320 performs processing according to one or more wireless system standards, such as the standards listed above. Receiver 320 performs various processing such as Radio Frequency (RF) to baseband conversion, amplification, analog to digital conversion, filtering, and the like. Various techniques for receiving are known in the art. Receiver 320 may be used to measure channel quality of the forward or reverse link, when the device is a mobile station or base station, respectively, although a separate channel quality estimator 335 is shown for clarity of discussion, detailed below.

Signals from receiver 320 are demodulated in demodulator 325 according to one or more communication standards. In an example embodiment, a demodulator capable of demodulating 1xEV-DV signals is deployed. In alternate embodiments, alternate standards may be supported, and embodiments may support multiple communication formats. Demodulator 330 may perform RAKE receiving, equalization, combining, deinterleaving, decoding, and various other functions as required by the format of the received signals. Various demodulation techniques are known in the art. In a base station 104, demodulator 325 will demodulate according to the reverse link. In a mobile station 106, demodulator 325 will demodulate according to the forward link. Both the data and control channels described herein are examples of channels that may be received and demodulated in receiver 320 and demodulator 325. Demodulation of the forward data channel will occur in accordance with signaling on the control channel, as described above.

Message decoder 330 receives demodulated data and extracts signals or messages directed to the mobile station 106 or base station 104 on the forward or reverse links, respectively. Message decoder 330 decodes various messages used in setting up, maintaining and tearing down a call (including voice or data sessions) on a system. Messages may include channel quality indications, such as C/I measurements, power control messages, or control channel messages used for demodulating the forward data channel. Various other message types are known in the art and may be specified in the various communication standards being supported. The messages are delivered to processor 350 for use in subsequent processing. Some or all of the functions of message decoder 330 may be carried out in processor 350, although a discrete block is shown for clarity of discussion. Alternatively, demodulator 325 may decode certain information and send it directly to processor 350 (a single bit message such as an ACK/NAK or a power control up/down command are examples).

Channel quality estimator 335 is connected to receiver 320, and used for making various power level estimates for use in procedures described herein, as well as for use in various other processing used in communication, such as demodulation. In a mobile station 106, C/I measurements may be made. In addition, measurements of any signal or channel used in the system may be measured in the channel quality estimator 335 of a given embodiment. As described more fully below, power control channels are another example. In a base station 104 or mobile station 106, signal strength estimations, such as received pilot power may be made. Channel quality estimator 335 is shown as a discrete block for clarity of discussion only. It is common for such a block to be incorporated within another block, such as receiver 320 or demodulator 325. Various types of signal strength estimates may be made, depending on which signal or which system type is being estimated. In general, any type of channel quality metric estimation block may be deployed in place of channel quality estimator 335 within the scope of the present invention. In a base station 104, the channel quality estimates are delivered to processor 350 for use in scheduling, or determining the reverse link quality, as described further below. Channel quality estimates may be used to determine whether up or down power control commands are required to drive either the forward or reverse link power to the desired set point. The desired set point may be determined with an outer loop power control mechanism, as described above.

Signals are transmitted via antenna 310. Transmitted signals are formatted in transmitter 370 according to one or more wireless system standards, such as those listed above. Examples of components that may be included in transmitter 370 are amplifiers, filters, digital-to-analog (D/A) converters, radio frequency (RF) converters, and the like. Data for transmission is provided to transmitter 370 by modulator 365. Data and control channels may be formatted for transmission in accordance with a variety of formats. Data for transmission on the forward link data channel may be formatted in modulator 365 according to a rate and modulation format indicated by a scheduling algorithm in accordance with a C/I or other channel quality measurement. A scheduler, such as scheduler 240, described above, may reside in processor 350. Similarly, transmitter 370 may be directed to transmit at a power level in accordance with the scheduling algorithm. Examples of components which may be incorporated in modulator 365 include encoders, interleavers, spreaders, and modulators of various types.

Message generator 360 may be used to prepare messages of various types, as described herein. For example, C/I messages may be generated in a mobile station for transmission on the reverse link. Various types of control messages may be generated in either a base station 104 or mobile station 106 for transmission on the forward or reverse links, respectively.

Data received and demodulated in demodulator 325 may be delivered to processor 350 for use in voice or data communications, as well as to various other components. Similarly data for transmission may be directed to modulator 365 and transmitter 370 from processor 350. For example, various data applications may be present on processor 350, or on another processor included in the wireless communication device 104 or 106 (not shown). A base station 104 may be connected, via other equipment not shown, to one or more external networks, such as the Internet (not shown). A mobile station 106 may include a link to an external device, such as a laptop computer (not shown).

Processor 350 may be a general-purpose microprocessor, a digital signal processor (DSP), or a special-purpose processor. Processor 350 may perform some or all of the functions of receiver 320, demodulator 325, message decoder 330, channel quality estimator 335, message generator 360, modulator 365, or transmitter 370, as well as any other processing required by the wireless communication device. Processor 350 may be connected with special-purpose hardware to assist in these tasks (details not shown). Data or voice applications may be external, such as an externally connected laptop computer or connection to a network, may run on an additional processor within wireless communication device 104 or 106 (not shown), or may run on processor 350 itself. Processor 350 is connected with memory 355, which may be used for storing data as well as instructions for performing the various procedures and methods described herein. Those of skill in the art will recognize that memory 355 may be comprised of one or more memory components of various types, that may be embedded in whole or in part within processor 350.

As described above, in a data system such as 1xEV-DV, it is desirable that the reverse link traffic channels be decoded with high probability in at least one of the base stations (Switching Diversity) and the interference to all reverse link base stations should be minimized. In addition, reliable reception of the R-CQICH is desired at the serving base station. The R-CQICH provides fast forward link channel condition updates for the BTS to efficiently operate the F-PDCH.

When a mobile station is not in soft handoff, the mobile station receives a single F-CPCCH from the serving BTS that might be transmitted by more than just the serving sector if the mobile station is in softer handoff with that BTS. The forward link transmit power for this F-CPCCH may be determined based on the R-CQICH from the mobile station through table-lookup without an outer-loop (as an alternative to the outer-loop power control method described above).

When the mobile station is in soft handoff between multiple BTSs, there are a variety of approaches to reverse link power control design. Several approaches are described below.

One approach is to use only a single reverse link power control feedback from the serving base station to the mobile station, such as used when the mobile station is not in soft handoff. This approach has the benefit that no forward link power or capacity is consumed by introducing F-CPCCHs from non-serving base stations. In other words, the non-serving base stations are not power controlling the mobile station's transmit power. Similarly, the mobile station need not measure forward link measurements except for the R-CQICH, nor transmit feedback for additional base stations on the reverse link. Additionally, there is only one stream of power commands for the mobile station to follow. A main drawback of this approach is that capacity may be severely reduced when imbalance exists between the forward and reverse links. For example, from time to time, the reverse link path loss from the mobile station to a non-serving base station may be smaller than that from the same mobile station to the serving base station. That non-serving base station would have high interference from the mobile station when this happens and would have no means to reduce this interference.

Another approach is to maintain reverse link power control feedback from every Active Set member BTS with time-division multiplexed R-PCSCH command streams, one for each non-serving BTS. This approach mitigates the forward/reverse link imbalance problem, but since the multiple reverse link feedback signals are time-multiplexed, the supportable rate may be reduced or the reverse link data rate and the associated interference have to be increased. The rate may be further reduced if symbol repetition is needed to keep the transmit power at a desired level for the R-PCSCH to reach all Active Set member base stations. An increase of the rate would require additional reverse link power and thus reduced capacity.

Figure 4:
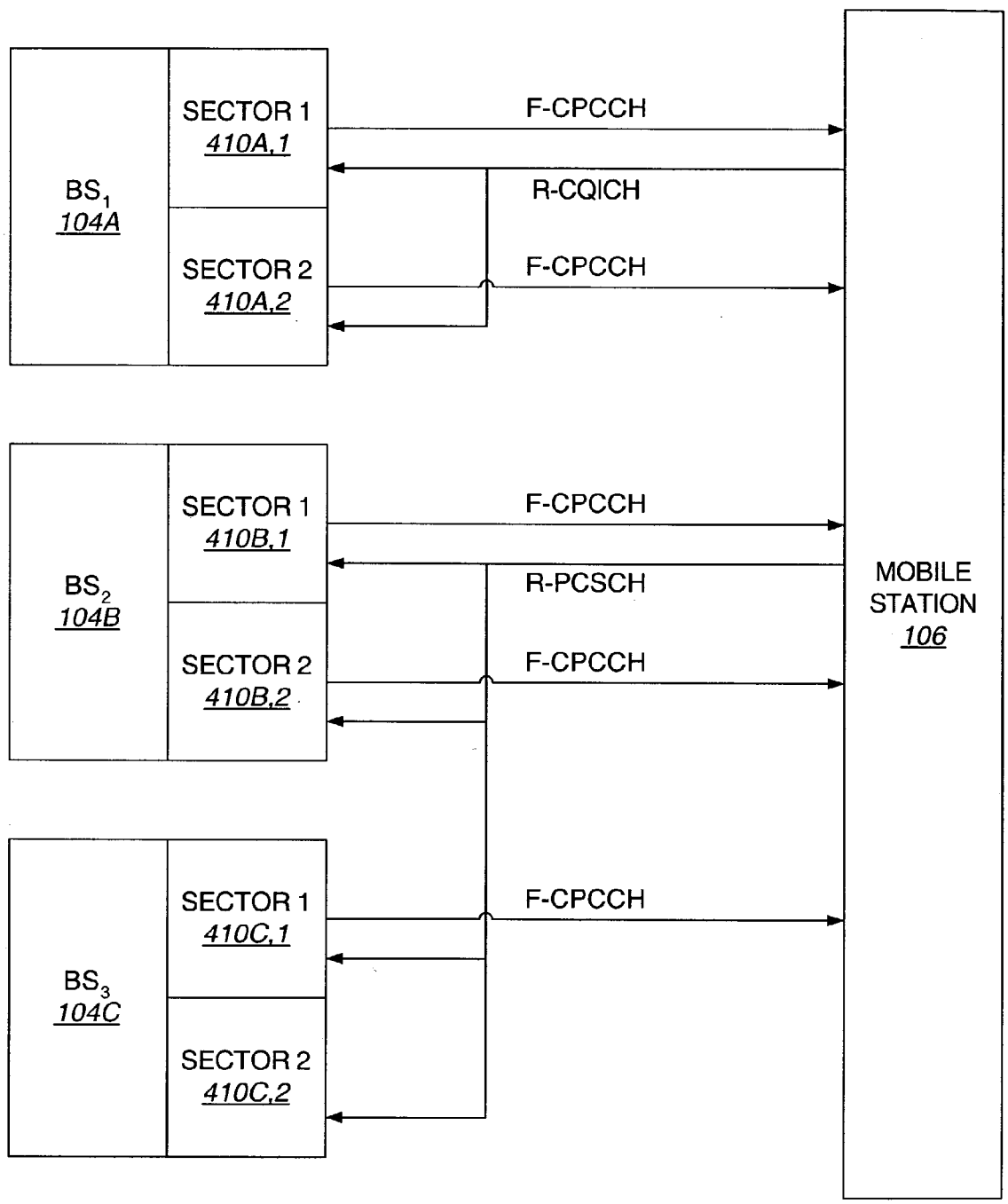
FIG. 4 depicts an example embodiment of a system employing a first reverse link power control stream for controlling the serving base station and a second reverse link power control stream for controlling the non-serving base stations.

FIG. 4 depicts an example embodiment of a system employing a first reverse link power control stream for controlling the serving base station and a second reverse link power control stream for controlling the non-serving base stations. The mobile station 106 receives a forward link power control stream from each Active Set base station 104A–104C, the F-CPCCH. In this example, each base station 104A–104C, $BS_1$–$BS_3$, respectively, includes two sectors, sector 1 and 2, labeled 410A,1–410C,2, respectively. In this example, the Active Set includes sectors 410A,1–2, 410B,1–2, and 410C. This is an example of so-called soft-softer handoff, since the mobile station is in handoff with multiple base stations (soft) as well as multiple sectors within one or more base stations (softer). Each Active Set sector transmits a F-CPCCH to mobile station 106. The F-CPCCH for sectors of a single base station transmits identical information for combining at the mobile station. Since the reverse link at a base station may be sector combined, a common power control command stream may thus be deployed.

The mobile station 106 provides reverse link power control feedback from every Active Set member BTS. The R-CQICH is used for the serving base station. One Reverse Power Control Subchannel (R-PCSCH) command stream is used to control the non-serving base stations.

As just described, each member sector in the mobile station's Active Set transmits an F-CPCCH for reverse link power control. Since the non-serving base stations cannot infer information about the forward link condition or the F-CPCCH reception at the mobile station from the R-CQICH, the mobile station sends the R-PCSCH in addition to the R-CQICH. The R-PCSCH is dedicated to carry the feedback of the F-CPCCH from the non-serving base stations while the R-CQICH may be used by the serving base station to determine the transmit power level on the F-CPCCH.

Note that there is only one reverse link power control bit stream from each BTS to the mobile through all its sectors. As such, there is no need to provide additional power control feedback about the F-CPCCH from non-serving sectors of the serving BTS. As shown, the reception of the reverse link at a sectorized BTS may be carried out by all the sectors. Note further that sector 2 of $BS_3$ 410C,2 is not in the Active Set, in this example, but may still receive the R-PCSCH, if desired.

Figure 5:
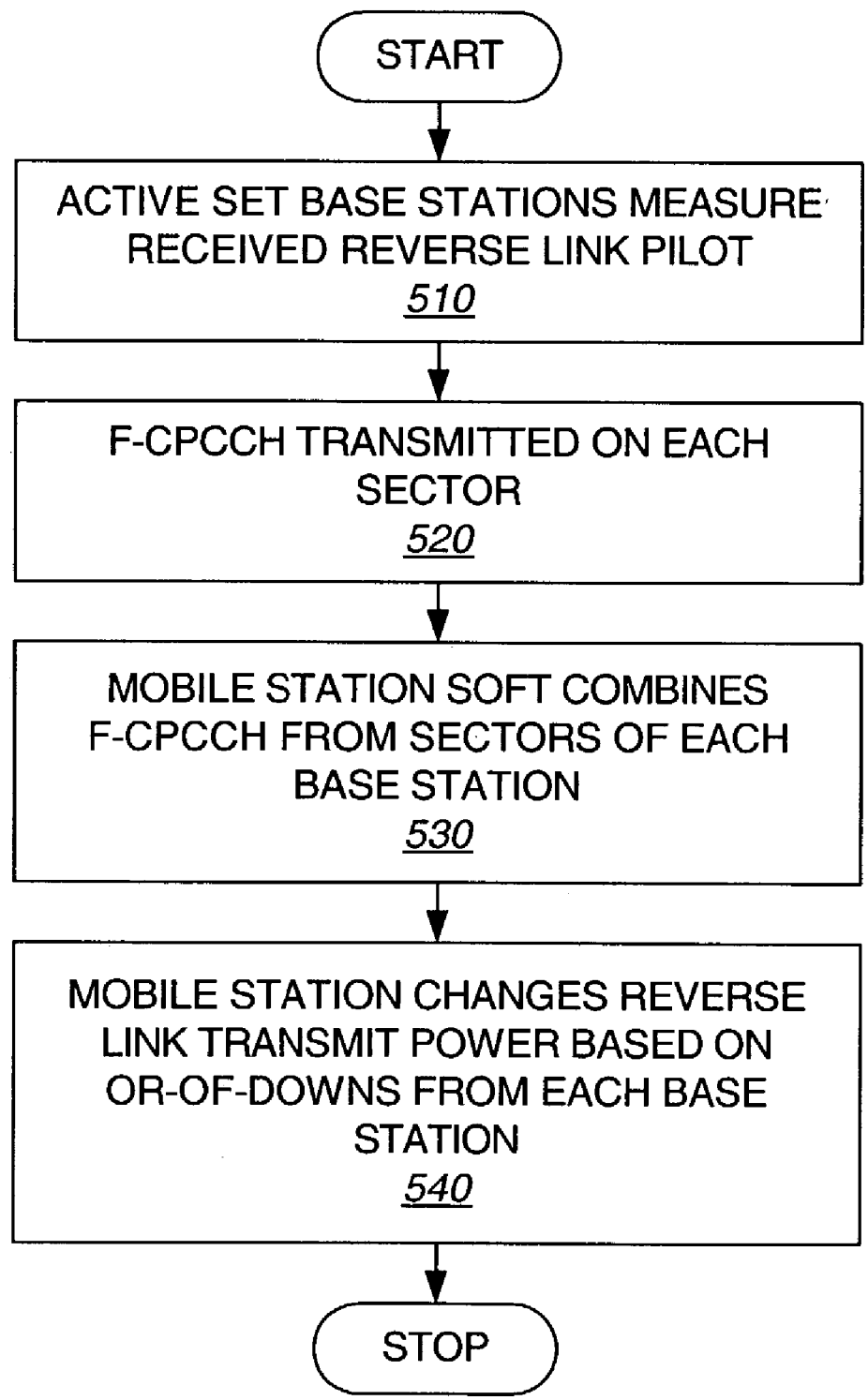
FIG. 5 is a flowchart of an example embodiment of a method of performing reverse link power control.

FIG. 5 is a flowchart of an example embodiment of a method of performing reverse link power control. The process begins in step 510, where each base station in the Active Set measures the received reverse link pilot from the mobile station. Proceed to step 520. In step 520, each sector transmits the F-CPCCH, with a power control command generated in response to the measured pilot power. Note that any power control procedure may be deployed to determine the power control commands, examples of which are given above. In an alternate embodiment, a signal other than the reverse link pilot may be used for power control. Proceed to step 530. In step 530, the mobile station soft combines the power control commands received from sectors of one base station. Proceed to step 540. In step 540, the mobile station changes the reverse link transmit power based on the "Or-of-downs" of the commands from each base station. Then the process may stop. This process is typically repeated once during each power control group.

Figure 6:
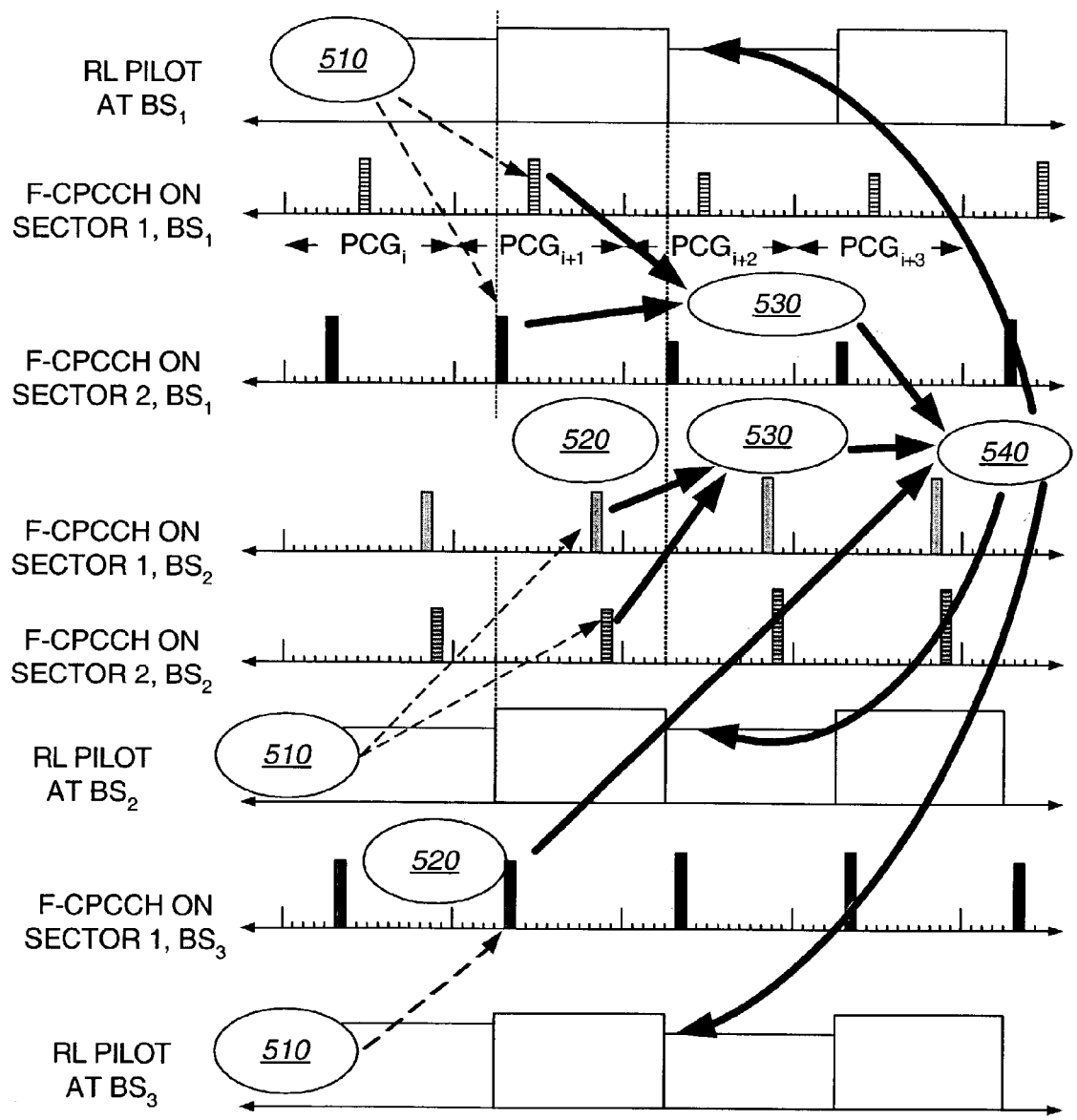
FIG. 6 depicts an example timing diagram of reverse link power control.

FIG. 6 depicts an example timing diagram of reverse link power control. This example corresponds to the example embodiment of the system shown in FIG. 4, and the steps detailed with respect to FIG. 5 are depicted in ovals with the corresponding step numbers. The reverse link pilot is received at each base station, $BS_1$–$BS_3$. The power control groups are labeled $PCG_i$, $PCG_{i+1}$, $PCG_{i+2}$, etc. The base stations measure the reverse link pilots during $PCG_i$, as described in step 510. Each sector then transmits the power control command corresponding to the pilot measurement during $PCG_{i+1}$ on its respective F-CPCCH, as described in step 520. The mobile station soft combines the commands from each base station, as described in step 530. In this example, the mobile station soft combines the F-CPCCH from sector 1 and sector 2 from $BS_1$ and soft combines the F-CPCCH from sector 1 and sector 2 from $BS_2$. The mobile station then determines whether to increase or decrease transmit power based on the "Or-of-downs" rule, as described in step 540. In this example, the combined commands from $BS_1$ and $BS_2$ are ORed with the command received on the F-CPCCH from sector 1 of $BS_3$. The transmit power is adjusted accordingly during $PCG_{i+2}$, as shown. These steps are detailed in FIG. 6 for one cycle, but the process may repeat each PCG, as described above with respect to FIG. 5.

Since the best forward link usually implies the best reverse link, the "OR-of-Down" rule provides adequate R-CQICH reception at the serving base station. When forward link/reverse link imbalance occurs, i.e., the reverse link to the serving base station is smaller than a reverse link to one of the non-serving base stations, the serving base station will be able to detect the insufficient R-PICH or R-CQICH level as part of its reverse link power control operation. Then, the serving base station may activate an R-CQICH repetition feature through F-PDCH or F-CACH without much reverse link capacity loss. This repetition technique is well known in the art.

Figure 7:
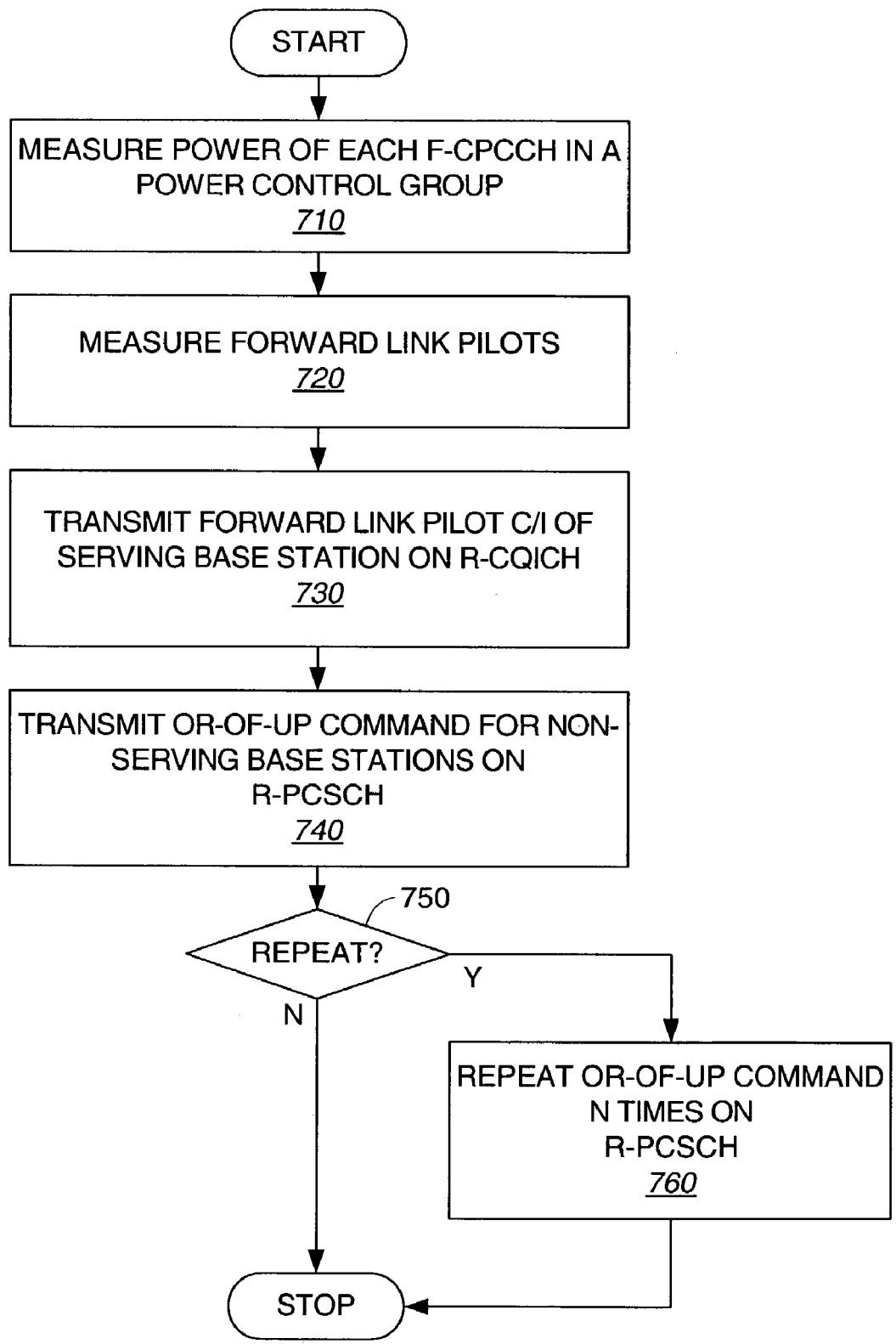
FIG. 7 depicts a flowchart of an example embodiment of a method of forward link power control.

FIG. 7 depicts a flowchart of an example embodiment of a method of forward link power control. The process starts at step 710. In step 710, the mobile station measures the power of each F-CPCCH from the members of the Active Set. In one embodiment, the serving base station may be power controlled based on the forward link channel quality, as indicated by the R-CQICH, and thus the F-CPCCH need only be measured for the non-serving base stations. This is shown in step 720. In an alternate embodiment, power control for the serving base station may be performed based on measurements of the serving base station F-CPCCH. Note that steps 710 and 720 may be carried out in any order, or may be performed in parallel. Proceed to step 730.

In step 730, the R-CQICH is transmitted to the serving base station to indicate the measured quality of the serving base station forward link. The R-COICH may be used for power control. One example is to perform a table lookup, as described above. Proceed to step 740.

In step 740, a power control command is determined for each non-serving base station. In this example, an "up" or "down" command is generated for each. If there are multiple non-serving base stations in the Active Set, then the mobile station applies an "Or-of-up" rule to generate a single command. That is, the power control command is "up" if any of the F-CPCCH measurements results in an "up" command, otherwise the command is "down". The power control command for the one or more non-serving base stations is transmitted on a single R-PCSCH, which may be received by all the non-serving base stations, as described above with respect to FIG. 4. The non-serving base stations adjust the transmit power of the F-CPCCH (and any other forward link channels, as desired) in response to the R-PCSCH. This technique allows the non-serving base stations to transmit at a lower level than would be the case without this feedback mechanism. Note that other logic in the decision of the command to transmit base on individual decision on the non-serving base stations may be applicable here to replace the "Or-of-up" logic.

In one embodiment, the mobile station may exclude signals from non-serving base stations that are deemed insufficient. For example, if a RAKE receiver is deployed, a limited number of fingers may be available for locking onto and tracking non-serving base stations. A common technique is to allocate the fingers to the strongest forward link paths. In this case, the RAKE receiver may be locked onto the most important Active Set members. The "Or-of-up" rule may be modified to include only the non-serving base stations with a predetermined quality level, or a predetermined number of "best" base stations. These may correspond to the Active Set members with the highest pilot Ec/Io. Furthermore, limiting the "Or-of-up" rule to a subset of the Active Set members should not increase the F-CPCCH bit error rate, since the reverse link power control rule, "Or-of-downs", as described above with respect to FIG. 5, is naturally limited to the same subset of the Active Set since the mobile station deems the other members of the Active Set as too weak to use. Note that, generally, the weakest received F-CPCCH will determine whether an "up" or "down" command is issued, and therefore, the F-CPCCH bit error rate is kept low on all F-CPCCHs.

Alternate embodiments may be deployed to reduce excess transmit power for an F-CPCCH which is not the weakest. For example, the F-CPCCH transmit level may be limited for better-positioned non-serving base stations, those whose forward link path loss to the mobile station is not the largest.

In one alternate embodiment, a base station directs the mobile station to send the Pilot Strength Measurement Message (PSMM), or its equivalent, where the forward link pilot quality measured at the mobile station is reported to the base station. From this message, the forward link path difference between Active Set members to the mobile station may be evaluated. Each non-serving base station may adjust the transmit level based on its path loss difference with respect to the largest forward link path loss. Thus, the starting transmit level from the non-serving base stations that have better-than-worst forward link path loss may be lowered by a delta that is set to the path loss difference of that base station and the pass loss of the worst base station (in the Active Set or its subset), as described above. When the first or subsequent PSMM is received, the Base Station Controller (BSC) or other system component, may also determine these deltas for the various non-serving base stations to use.

An example of this alternate method is as follows: From the PSMM or other mobile station report, a base station determines the forward link pilot Ec/Io values at the mobile station for $BS_1$, $BS_2$, and $BS_3$ are −9 dB, −10 dB, and −13 dB, respectively. For this example, assume that $BS_1$ is the serving base station. The path loss difference between $BS_2$ and that of the worst forward link base station ($BS_3$) is 3 dB. The initial transmit level of the F-CPCCH to the mobile station that sent the report for $BS_2$ would then be approximately 3 dB lower than that for the worst base station ($BS_3$). This way, unnecessary transmit power of the F-CPCCH from $BS_2$ may be eliminated, since the mobile station would measure a similar received F-CPCCH from either $BS_2$ or $BS_3$.

In another alternate embodiment, with or without the PSMM, each non-serving base station may determine its respective path loss difference with that of the worst base station by measuring the reverse link pilot for other channels. This may be part of the closed-loop reverse link power control mechanism. Since there is only one transmit level from the mobile station and that the reverse link path loss is likely to be correlated with the forward link path loss, the base station may find out the path loss difference with that of the worst base station. The same set of delta values may be determined and used.

An example of this alternate method is as follows: From the reverse link measurement, the base station may determine the reverse link pilot Ec/(Io+No) values for $BS_1$, $BS_2$, and $BS_3$ are −21 dB, −22 dB, and −24 dB, respectively. In this example, assume that $BS_1$ is the serving base station. The path loss difference between $BS_2$ and that of the worst forward link base station ($BS_3$) is 3 dB. The initial transmit level of the F-CPCCH to the mobile station for $BS_2$ would then be approximately 3 dB lower than that for the worst base station ($BS_3$). This way, unnecessary transmit power of the F-CPCCH from $BS_2$ may be eliminated, since the mobile station would measure similar received F-CPCCH from either $BS_2$ or $BS_3$.

Return now to the flowchart of FIG. 7. Proceed to decision block 750. In decision block 750, if the R-PCSCH is to be repeated, proceed to step 760 and repeat the "Or-of-up" command for a predetermined number of cycles, N, on the R-PCSCH. If not, the process may stop. As in FIG. 5, the process may be repeated each power control group. The repetition feature of step 750 and 760 is optional. If may be useful when repetition is necessary to reach all the non-serving base stations, which may have varying reverse link path losses. Repetition allows for increased signal to noise ratio without a corresponding increase in transmit power. It may be the case that when the reverse link benefits from repetition, the forward link may also. In that case the F-CPCCH may be repeated as well. This alternative is detailed further below with respect to FIG. 10. As mentioned previously, the R-CQICH to the serving base station may also be repeated (not shown in FIG. 7), and a corresponding repetition of the serving base station F-CPCCH may be desired. This option is detailed further below with respect to FIG. 10.

Figure 8:
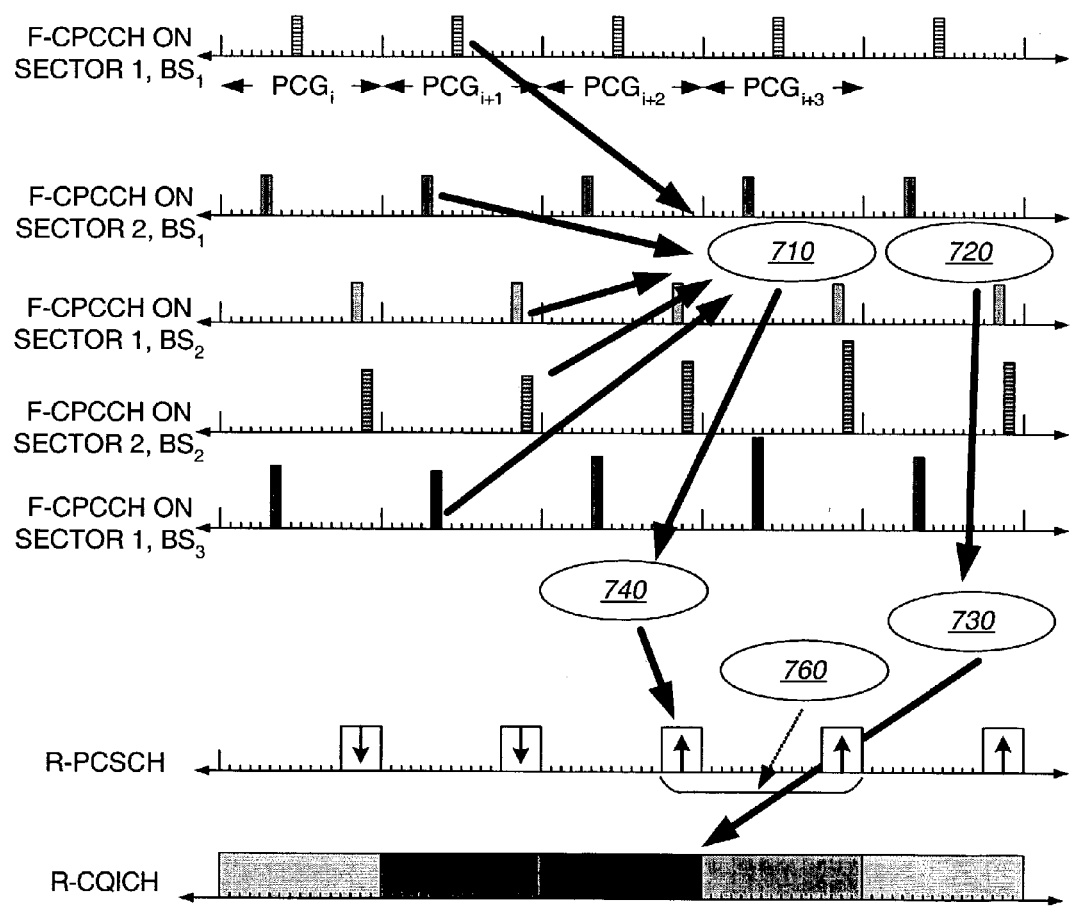
FIG. 8 depicts an example timing diagram of forward link power control.

FIG. 8 depicts an example timing diagram of forward link power control. This example corresponds to the example embodiment of the system shown in FIG. 4, and the steps detailed with respect to FIG. 7 are depicted in ovals with the corresponding step numbers. The F-CPCCH is transmitted from each Active Set sector. In this example, the F-CPCCH is transmitted from sectors 1 and 2 of base stations $BS_1$ and $BS_2$, and sector 1 of base station $BS_3$. The power control groups are labeled $PCG_i$, $PCG_{i+1}$, $PCG_{i+2}$, etc. During $PCG_{i+1}$, the mobile station measures the forward link pilots and/or F-CPCCHs, as described in steps 710 and 720. During $PCG_{i+2}$, the mobile station transmits the R-PCSCH, as described in step 740. It may be repeated as necessary, as described in step 760. The mobile station also transmits the R-CQICH, as described in step 730. These steps are detailed in FIG. 8 for one cycle, but the process may repeat each PCG, as described above with respect to FIG. 7. In this example, the non-serving base station adjusts its forward link transmit power in $PCG_{i+3}$ in response to the R-CQICH. The non-serving base stations adjust their transmit power in accordance with the R-PCSCH subsequent to receiving the R-PCSCH, including any repeated symbols.

Figure 9:
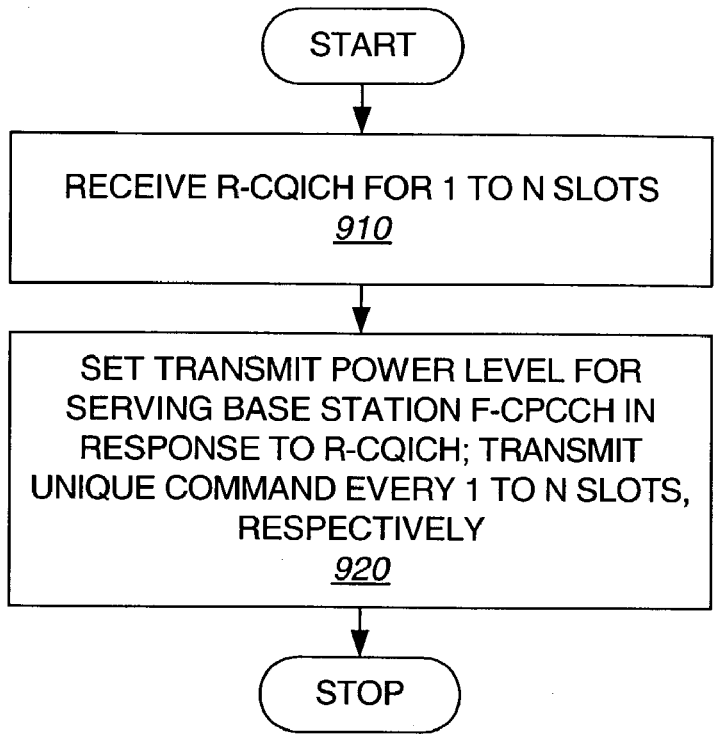
FIG. 9 is a flowchart of an example embodiment deploying R-CQICH repetition.

As described above, in some instances, it may be desirable for the R-CQICH to be repeated to maintain a sufficient signal to noise ratio for a given transmit level. FIG. 9 is a flowchart of an example embodiment deploying R-CQICH repetition. The process begins in step 910, where the serving base station receives the R-CQICH for 1 to N slots, where N is the number of repetitions. The received symbols may be combined if N>1. Proceed to step 920. In step 920, the transmit power level for the serving base station F-CPCCH is set in response to the R-CQICH. Each unique command on the F-CPCCH may be transmitted during 1 to N slots, in accordance with the repetition of the R-CQICH. This repetition allows a sufficiently low bit error rate on both the R-CQICH and F-CPCCH without increasing the transmit power of either channel above a desired threshold.

Figure 10:
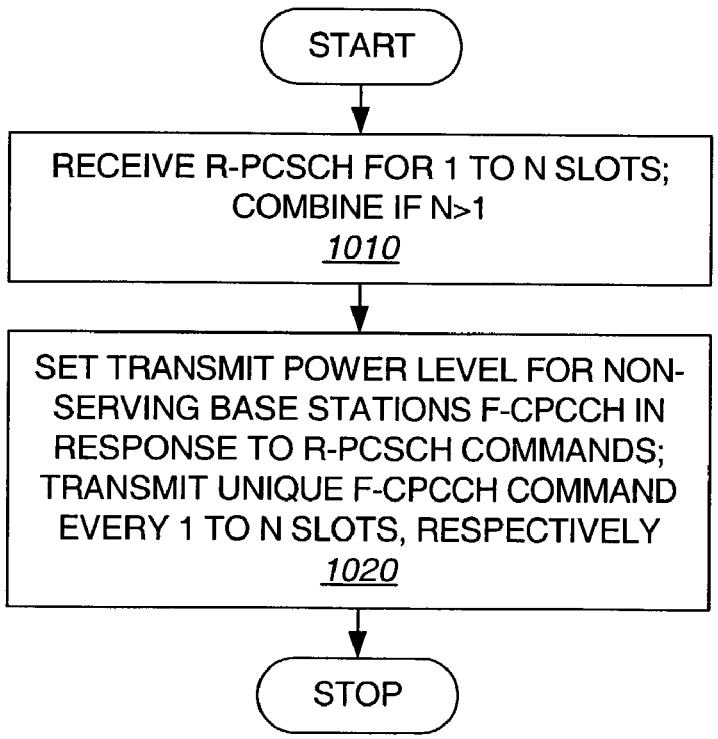
FIG. 10 is a flowchart of an example embodiment deploying R-PCSCH repetition.

In like manner, in some instances, it may be desirable for the R-PCSCH to be repeated to maintain a sufficient signal to noise ratio for a given transmit level. FIG. 10 is a flowchart of an example embodiment deploying R-PCSCH repetition. The process begins in step 1010, where the serving base station receives the R-PCSCH for 1 to N slots, where N is the number of repetitions. The symbols may be combined when N>1. Proceed to step 1020. In step 1020, the transmit power level for each non-serving base station F-CPCCH is set in response to the R-PCSCH. Each unique command on the F-CPCCH may be transmitted during 1 to N slots, in accordance with the repetition of the R-PCSCH. This repetition allows a sufficiently low bit error rate on both the R-PCSCH and F-CPCCH without increasing the transmit power of either channel above a desired threshold.

As described above, in some embodiments, when a mobile station is in soft handoff, the reverse link power control commands from each base station are carried on the respective F-CPCCH channels, but the power control streams are carried on F-CPCCH channels with different rates. For example, there is a serving base station and one or more non-serving base stations among the Active Set members. The power control commands are transmitted by the serving base station at a higher rate (e.g. 800 Hz), while the power control commands transmitted by the non-serving base stations are repeated on or more times, therefore they have a lower rate (e.g., 400 Hz or 200 Hz). In general, each F-CPCCH channel may be transmitted at any rate. The "Or-of-downs" rule may be modified to account for F-CPCCH channels of differing rates.

Figure 11:
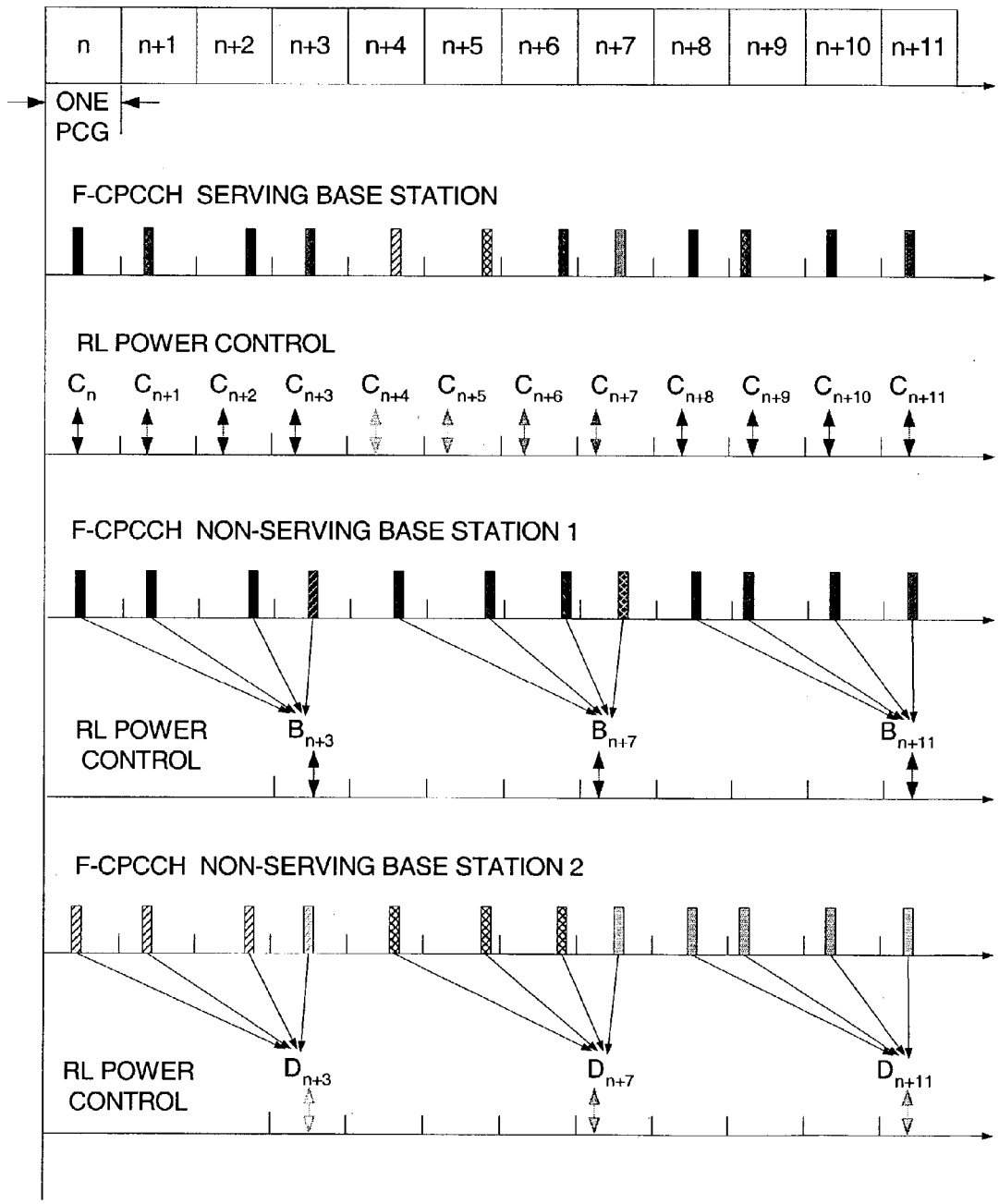
FIG. 11 depicts an example of the interrelationship between power control commands and the F-CPCCH channels.

FIG. 11 depicts an example of the interrelationship between power control commands and the F-CPCCH channels. In this example, the Active Set size is three. The power control bits from the serving base station arrive at a rate of 800 Hz and the reverse link (RL) power control bits from two non-serving base stations (non-serving base stations 1 and 2) arrive at a rate of 200 Hz. Power control group (PCG) periods are labeled n, n+1, n+2, etc. The F-CPCCH from the serving base station is transmitted once per PCG, and each transmission contains a unique value. The mobile station extracts RL power control commands, $C_n$, $C_{n+1}$, $C_{n+2}$, etc., during successive PCGs. The F-CPCCH for non-serving base stations 1 and 2 are also transmitted during each PCG. However, in this example, one value is transmitted for four consecutive power control groups. The mobile station combines the received F-CPCCH values for four PCG periods and sends RL power control commands once every four PCGs. This allows the F-CPCCH to be transmitted at lower power, thus conserving forward link capacity. Non-serving base station 1 generates RL power control commands $B_{n+3}$, $B_{n+7}$, $B_{n+11}$, etc. Non-serving base station 2 generates RL power control commands $D_{n+3}$, $D_{n+7}$, $D_{n+11}$, etc. For instance, the F-CPCCH symbols from non-serving base station 1 during the power control groups n, n+1, n+2 and n+3 carry the same RL power control symbol and the RL power control command $B_{n+3}$ is extracted at the end of PCG n+3.

In prior art CDMA systems, power control commands from different base stations arrive at the mobile station at the same rate, and the commands in a PCG are combined following the "Or-of-downs" rule to provide a decision that the mobile station follows to adjust its transmit power. That is, if any of the power control commands is a down command, the mobile station reduces its transmission power. The mobile station increases its transmission power only when all the power control commands are up. Given the RL power control commands described above, $C_i$, $B_j$, and $D_k$, which are generated at varying frequencies, the mobile station must a determine how to adjust its transmission power in response. The prior art "Or-of-downs" rule can't be applied directly, as the power control commands arrive at different rates. A variety of example embodiments for solving this are described below. Three general solutions are provided: bias towards the serving base station, bias towards the non-serving base stations, and a solution balanced between the serving and non-serving base stations. Those of skill in the art will readily adapt these principles to various solutions for transmit power control in response to multiple rate power control command streams.

First, consider an example embodiment biased toward the serving base station. In this example, the command from the serving is used to adjust the RL power during each PCG. During a PCG where commands are generated from one or more non-serving base stations, the serving and non-serving base station commands are combined following the "Or-of-downs" rule, described above. For example, $C_i$ for i=n, n+1, n+2, n+4, n+5, n+6, n+8, ... are used to adjust the RL power during the corresponding PCGs. $C_i$, $B_i$, and $D_i$ for i=n+3, n+7, n+11, ... are combined using the "Or-of-downs" rule during the remaining corresponding PCGs. This scheme is biased towards the serving base station, as the RL power is controlled more by the serving base station than by the non-serving base stations. As will be clear to those of skill in the art, the solution just described is an example only. Any number of base stations may be supported using power control command streams and each stream may be any rate.

Second, consider an example embodiment biased toward the non-serving base stations. In this example, all the commands from the serving base station are combined with the latest received non-serving base station commands using the "Or-of-downs" command, described above. For example, $C_i$ for i=n+3, n+4 and n+5 are respectively combined with $B_{n+3}$ and $D^{n+3}$, using the "Or-of-downs" rule, to adjust the RL power for the corresponding PCGs. This scheme is biased towards the non-serving base stations, as the RL power is controlled more by the non-serving base stations than by the serving base station. As will be clear to those of skill in the art, the solution just described is an example only. Any number of base stations may be supported using power control command streams and each stream may be any rate.

Third, consider a number of embodiments in which the transmit power is controlled in a manner balanced between the serving and non-serving base stations. Since the commands from the serving base station arrive more frequently than those from the non-serving base stations, they may be treated differently in order to maintain some balance between the serving and non-serving base stations in controlling the RL power. Specifically, when the RL power is adjusted following the order from the non-serving base stations, the power adjustment may be larger than if the adjustment is solely based on the commands from the serving base station.

A first balanced embodiment uses a scheme similar to the first example, biased toward the serving base station, described above. During PCGs in which only commands from the serving base station are received, the serving base station commands are used to determine whether the transmit power should be increased or decreased. However, the up or down step size of the power change is made in proportion to a first parameter, ST. During PCGs in which commands from the serving and non-serving base stations arrive, the commands from the serving and the non-serving base stations are combined (using the "Or-of-downs" rule) to form a combined command. The up or down decision is made by using the "Or-of-downs" rule on the serving base station command and the combined command. When the combined command is the same as the serving base station command, the power is adjusted with an up or down step size in proportion to a second parameter. When the combined command is different than the serving base station command, the power is adjusted with up or down step sizes in proportion to a third parameter.

In the example of FIG. 11, due to the relative frequency of the command streams, the second parameter may be set to 4*ST and the third parameter may be set to 3*ST. This example may be readily extended to power control command streams of any rate. In general, when the ratio between the serving base station rate and one or more non-serving base stations is K (K≧1), the second parameter may be set to K*ST and the third parameter may be set to (K−1)*ST.

A second balanced embodiment also uses a scheme similar to the first example, biased toward the serving base station, described above. As before, during PCGs in which only commands from the serving base station are received, the serving base station commands are used to determine whether the transmit power should be increased or decreased. Again, the up or down step size of the power change is made in proportion to a first parameter, ST. During PCGs in which commands from the serving and non-serving base stations arrive, the non-serving base station commands are combined (using the "Or-of-downs" rule) to form a combined command. The up or down decision is made by using the "Or-of-downs" rule on the serving base station command and the combined command. In this example, the combined command and the serving base station command are weight-combined to form a metric, M. The power is adjusted with an up or down step size in proportion to a second parameter, computed as M*ST.

Using the relative frequency of the command streams, shown in FIG. 11, the metric M may be computed as follows. A +1 is assigned to an up command and a −1 is assigned to a down command (those of skill in the art will recognize that these values are examples only). The combined command ("Or-of-downs" of the non-serving base stations) is multiplied by four and added to the summation of the four previous commands from the serving base station to form the metric, M. For example, at PCG n+3, M is calculated as follows: $M=4*(\text{Or-of-downs}(B_{n+3}, D_{n+3}))+C_{n+3}+C_{n+2}+C_{n+1}+C_n$.

This example may be readily extended to power control command streams of any rate. In general, when the ratio between the serving base station rate and one or more non-serving base stations is K (K≧1), the metric M may be computed as M=(Combined command of non-serving base stations)*K+(Summation of the K previous serving base station commands).

Note that serving and non-serving terminology is used only for clarity in the example embodiments. The techniques disclosed for controlling transmit power in response to received multiple-rate power command streams applies to any collection of base stations, whether or not they are serving or non-serving base stations. The embodiments could be described replacing "serving" with "primary" and "non-serving" with "other" or "secondary" base stations, and the principles disclosed would apply with equal force.

It should be noted that in all the embodiments described above, method steps may be interchanged without departing from the scope of the invention. The descriptions disclosed herein have in many cases referred to signals, parameters, and procedures associated with the 1xEV-DV standard, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a receiver for receiving a plurality of power control channels, each power control channel comprising a sequence of slots, at least one of the plurality of power control channels comprising power control commands transmitted in at least one subset of the sequences of slots, wherein a first power control channel comprises power control commands in each of the sequence of slots; and
   a transmitter for transmitting signals at a transmit power level; and
   a processor for adjusting the transmit power level during each slot in response to the plurality of power control channels, and
   the processor:
   combines any power control commands received in a slot from the remainder of the plurality of power control channels to form a combined power control command;
   adjusts the transmit power level for the slot in proportion to a first parameter in accordance with the power control command of the first power control channel when the remainder of the plurality of power control channels do not contain a power control command for the slot;
   adjusts the transmit power level for the slot in proportion to a second parameter in accordance with the combined power control command when the combined power control command for the slot, if any, is the same as the power control command of the first power control channel; and
   decreases the transmit power level for the slot in proportion to a third parameter otherwise.

2. An apparatus comprising:
   a receiver for receiving a plurality of power control channels, each power control channel comprising a sequence of slots, at least one of the plurality of power control channels comprising power control commands transmitted in at least one subset of the sequences of slots; wherein the ratio of the rare of power control commands in the remainder of the plurality of power control channels to the rate of power control commands in the first power control channels is K;
   the second parameter is set to K multiplied by the first parameter;
   the third parameter is set to K−1 multiplied by the first parameter;
   a transmitter for transmitting signals at a transmit power level; and
   a processor for adjusting the transmit power level during each slot in response to the plurality of power control channels.

3. An apparatus comprising:
   a receiver for receiving a plurality of power control channels, each power control channel comprising a sequence of slots, at least one of the plurality of power control channels comprising power control commands transmitted in at least one subset of the sequences of slots,
   wherein a first power control channel comprises power control commands in each of the sequence of slots;
   the remainder of the plurality of power control channels comprises power control commands in every K slots; and
   the processor:
   combines any power control commands received in a slot from the remainder of the plurality of power control channels to form a combined power control command;
   adjusts the transmit power level for the slot in proportion to a first parameter in accordance with the power control command of the first power control channel when the remainder of the plurality of power control channels do not contain a power control command for the slot; and
   adjusts the transmit power level for the slot in proportion to a second parameter otherwise, the second parameter computed as the sum of the K most recent power control commands received on the first power control channel and K multiplied by the combined power control command;
   a transmitter for transmitting signals at a transmit power level; and
   a processor for adjusting the transmit power level during each slot in response to the plurality of power control channels.

4. An apparatus, configurable in a first mode or a second mode, comprising:
   a receiver for:
   receiving a first channel from a remote station when operating in the first mode, the first channel comprising channel quality indicators; and
   receiving a second channel from the remote station when operating in the second mode, the second channel a dedicated power channel comprising power control commands;
   a processor for:
   configuring the apparatus in the first or second mode;
   determining a transmit power level in response to a channel quality indicator when configured in the first mode; and
   determining the transmit power level in response to a power control command when configured in the second mode; and
   a transmitter for transmitting to the remote station in accordance with the transmit power level.

5. The apparatus of claim 4, further comprising:
   a power estimator for measuring the power of the first or second channels and generating a signal power measurement; and
   wherein:
   the processor further generates a reverse link power control command in response to the signal power measurement; and
   the transmitter transmits at least one reverse link power control commands to the remote station.

6. A wireless communication device, configurable in a first mode or a second mode, comprising:
   a receiver for:

receiving a first channel from a remote station when operating in the first mode, the first channel comprising channel quality indicators; and receiving a second channel from the remote station when operating in the second mode, the second channel a dedicated power channel comprising power control commands;

a processor for:

configuring the apparatus in the first or second mode;

determining a transmit power level in response to a channel quality indicator when configured in the first mode; and determining the transmit power level in response to a power control command when configured in the second mode; and a transmitter for transmitting to the remote station in accordance with the transmit power level.

7. A wireless communication system, including a wireless communication device, configurable in a first mode or a second mode, comprising:

a receiver for:

receiving a first channel from a remote station when operating in the first mode, the first channel comprising channel quality indicators; and receiving a second channel from the remote station when operating in the second mode, the second channel a dedicated power channel comprising power control commands;

a processor for:

configuring the apparatus in the first or second mode;

determining a transmit power level in response to a channel quality indicator when configured in the first mode; and determining the transmit power level in response to a power control command when configured in the second mode; and a transmitter for transmitting to the remote station in accordance with the transmit power level.

8. A method of power control, comprising:

receiving a plurality of power control channels, each power control channel comprising a sequence of slots, at least one of the plurality of power control channels comprising power control commands transmitted in at least one subset of the sequences of slots, wherein a first power control channel comprises power control commands in each of the sequence of slots; and transmitting signals at a transmit power level; and adjusting the transmit power level during each slot in response to the plurality of power control channels, wherein the transmit power adjusting comprises:

combining any power control commands received in a slot from the remainder of the plurality of power control channels to form a combined power control command;

adjusting the transmit power level for the slot in proportion to a first parameter in accordance with the power control command of the first power control channel when the remainder of the plurality of power control channels do not contain a power control command for the slot;

adjusting the transmit power level for the slot in proportion to a second parameter in accordance with the combined power control command when the combined power control command for the slot, if any, is the same as the power control command of the first power control channel; and decreasing the transmit power level for the slot in proportion to a third parameter otherwise.

9. A method of power control, comprising:

receiving a plurality of power control channels, each power control channel comprising a sequence of slots, at least one of the plurality of power control channels comprising power control commands transmitted in at least one subset of the sequences of slots, wherein the ratio of the rate of power control commands in the remainder of the plurality of power control channels to the rate of power control commands in the first power control channels is K;

the second parameter is set to K multiplied by the first parameter;

the third parameter is set to K−1 multiplied by the first parameter; and transmitting signals at a transmit power level; and adjusting the transmit power level during each slot in response to the plurality of power control channels.

10. A method of power control, comprising:

receiving a plurality of power control channels, each power control channel comprising a sequence of slots, at least one of the plurality of power control channels comprising power control commands transmitted in at least one subset of the sequences of slots, wherein a first power control channel comprises power control commands in each of the sequence of slots;

the remainder of the plurality of power control channels comprises power control commands in every K slots; and transmitting signals at a transmit power level; and adjusting the transmit power level during each slot in response to the plurality of power control channels, wherein the transmit power adjusting comprises:

combining any power control commands received in a slot from the remainder of the plurality of power control channels to form a combined power control command;

adjusting the transmit power level for the slot in proportion to a first parameter in accordance with the power control command of the first power control channel when the remainder of the plurality of power control channels do not contain a power control command for the slot; and adjusting the transmit power level for the slot in proportion to a second parameter otherwise, the second parameter computed as the sum of the K most recent power control commands received on the first power control channel and K multiplied by the combined power control command.

11. A method of power control, operable in a first mode or a second mode, comprising receiving a first channel from a remote station when operating in the first mode, the first channel comprising channel quality indicators;

receiving a second channel from the remote station when operating in the second mode, the second channel a dedicated power channel comprising power control commands;

determining a transmit power level in response to a channel quality indicator when operating in the first mode;

determining the transmit power level in response to a power control command when configured in the second mode; and transmitting to the remote station in accordance with the transmit power level.

12. The method of claim 11, further comprising:
measuring the power of the first or second channels and generating a signal power measurement;
generating a reverse link power control command in response to the signal power measurement; and
transmitting one or more reverse link power control commands to the remote station.

13. An apparatus, operable in a first mode or a second mode, comprising:
means for receiving a first channel from a remote station when operating in the first mode, the first channel comprising channel quality indicators;
means for receiving a second channel from the remote station when operating in the second mode, the second channel a dedicated channel comprising power control commands;
means for determining a transmit power level in response to a channel quality indicator when operating in the first mode;
means for determining the transmit power level in response to a power control command when configured in the second mode; and
means for transmitting to the remote station in accordance with the transmit power level.

14. The apparatus of claim 13, further comprising:
means for measuring the power of the first or second channels and generating a signal power measurement;
means for generating a reverse link power control command in response to the signal power measurement; and
means for transmitting one or more reverse link power control commands to the remote station.

15. Processor readable media, operable to perform the following steps:
receiving a first channel from a remote station when operating in a first mode, the first channel comprising channel quality indicators;
receiving a second channel from the remote station when operating in a second mode, the second channel a dedicated power channel comprising power control commands;
determining a transmit power level in response to a channel quality indicator when operating in the first mode;
determining the transmit power level in response to a power control command when configured in the second mode; and
transmitting to the remote station in accordance with the transmit power level.

* * * * *